(12) United States Patent
Thoukydides et al.

(10) Patent No.: US 9,775,172 B2
(45) Date of Patent: Sep. 26, 2017

(54) METHOD AND APPARATUS FOR WIRELESS COMMUNICATION

(71) Applicant: Samsung Electronics Co., Ltd., Gyeonggi-do (KR)

(72) Inventors: Alexander Thoukydides, Cambridge (GB); Mark Rison, Cambridge (GB)

(73) Assignee: Samsung Electronics Co., Ltd (KR)

( * ) Notice: Subject to any disclaimer, the term of this patent is extended or adjusted under 35 U.S.C. 154(b) by 149 days.

(21) Appl. No.: 14/609,022

(22) Filed: Jan. 29, 2015

(65) Prior Publication Data

US 2016/0227531 A1 Aug. 4, 2016

(51) Int. Cl.
*H04W 48/12* (2009.01)
*H04W 74/00* (2009.01)
*H04W 74/08* (2009.01)
*H04W 72/04* (2009.01)

(52) U.S. Cl.
CPC .......... *H04W 74/006* (2013.01); *H04W 48/12* (2013.01); *H04W 72/0446* (2013.01); *H04W 74/0808* (2013.01); *H04W 74/0816* (2013.01)

(58) Field of Classification Search
CPC ............. H04W 84/12; H04W 74/0816; H04W 72/0446; H04W 48/12; H04L 5/0007
See application file for complete search history.

(56) References Cited

U.S. PATENT DOCUMENTS

2016/0043855 A1* 2/2016 Seok ................. H04W 74/0816
370/330
2016/0088513 A1* 3/2016 Huang .............. H04W 74/0816
370/328

* cited by examiner

*Primary Examiner* — Faruk Hamza
*Assistant Examiner* — Aixa Guadalupe-Cruz
(74) *Attorney, Agent, or Firm* — The Farrell Law Firm, P.C.

(57) ABSTRACT

A next generation device is provided. The next generation device is configured for communicating within a wireless network including an access point (AP) supporting the next generation device. The next generation device includes a shorter Slot Time for medium access than legacy devices.

9 Claims, 2 Drawing Sheets

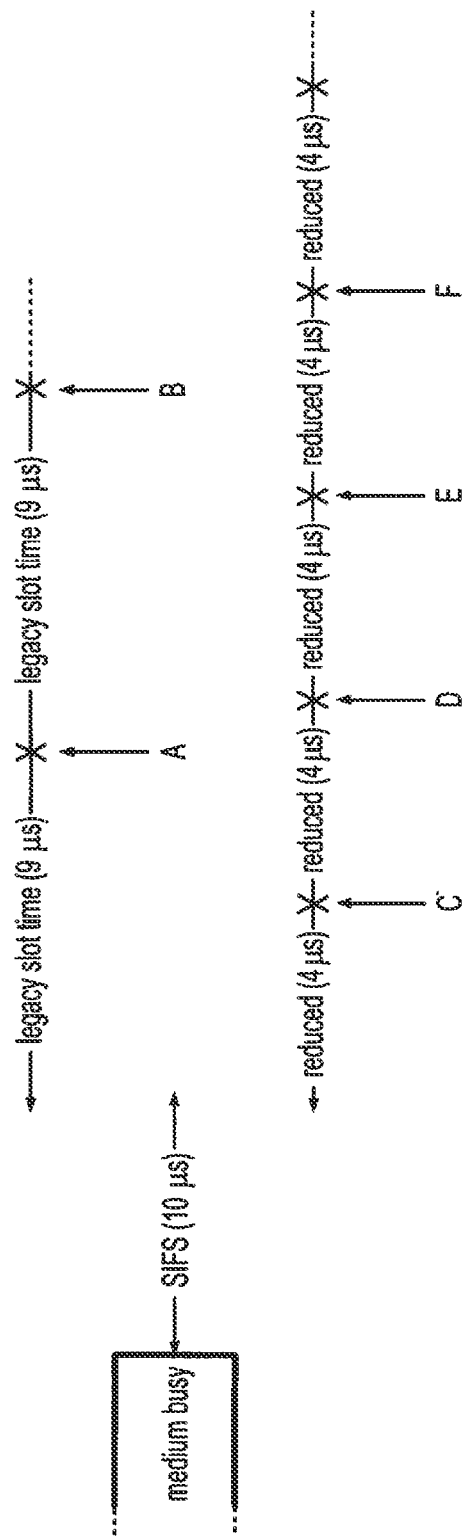
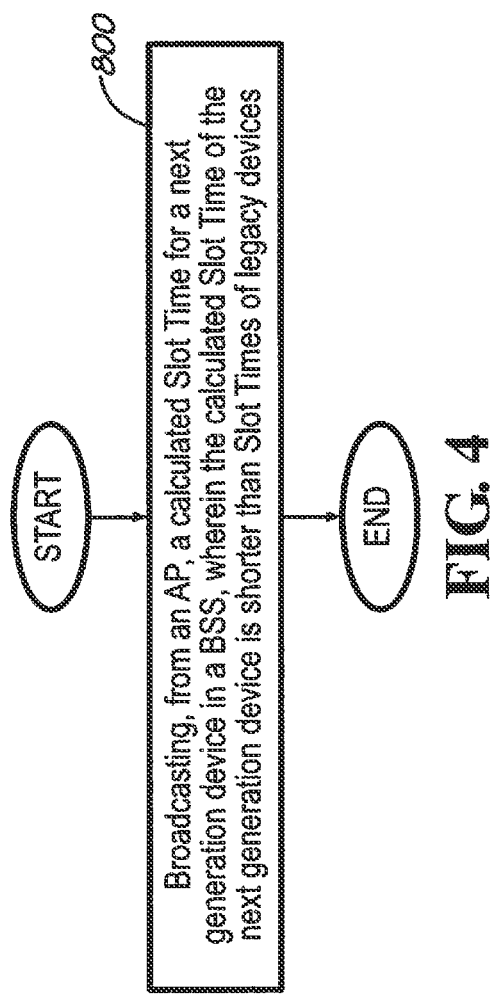
FIG. 3
FIG. 4

METHOD AND APPARATUS FOR WIRELESS COMMUNICATION

BACKGROUND

1. Field of the Disclosure

The present disclosure relates generally to a method and apparatus for wireless communication, and more particularly, to a method and apparatus for improving communication efficiency within a basic service set (BSS) including a plurality of next-generation devices and legacy devices and within a BSS including next-generation devices which overlaps with another BSS including legacy devices.

2. Description of the Related Art

IEEE 802.11 networks generally operate using a distributed contention-based medium access. A device wanting to initiate a transmission must wait until it sees that the medium is idle for a particular length of time; that time is comprised of an inter-frame space (IFS) plus a number of backoff slots. There are a number of different IFSs used for different purposes. The most common from the IEEE 802.11 standard includes short IFS (SIFS); most of the others are formed by adding integer multiples of the Slot Time. SIFS is used between packets in a non-interruptible frame exchange sequence, e.g. a Data frame followed by its Acknowledgement.

New frame exchanges will use one of the longer IFSs. Devices supporting quality of service (QoS) will generally use the arbitrary IFS[i] (AIFS[i]) corresponding to the QoS category i of the frame to be transmitted. Devices not supporting QoS will generally use distributed IFS (DIFS). Each device will also maintain a contention window (CW) for each supported QoS category and, for the packet to be transmitted, will select a random number of backoff slots up to the current length of the Contention Window. All of the devices with something to transmit that see the medium idle for the IFS they selected will then decrement their backoff slot number for each additional Slot Time that they see the medium remains idle. If the number of backoff slots reaches zero then a device is allowed to transmit. If the medium becomes non-idle before that happens then the countdown is suspended; it is resumed from where it left off (not reset) when the medium is again idle for at least the SIPS.

There is a possibility that multiple devices will start to transmit at the same time if their backoff all end after the same number of slots. This will usually result in the frame not being acknowledged. In this case the device will increase the size of its Contention Window (up to a maximum size depending on the QoS category). This makes it less likely that the next transmission will be initiated at exactly the same time as another device.

By this means multiple devices independently contend for access to the medium. Whilst there are optional centralized scheduling or coordination mechanisms they are not commonly implemented or used. Higher priority QoS categories use shorter AIFS[i] and smaller maximum Contention Windows to give prioritized access.

All of the above is the existing behavior in the IEEE 802.11 standard and of the legacy devices currently deployed.

The forthcoming IEEE 802.11ax amendment to the standard, Enhancements for high efficiency WLAN (HEW), is intended to improve the performance in highly congested environments where the existing medium access approach does not work well. The problem is that HEW devices, e.g., next generation devices, supporting the HEW amendment will be operating in an environment where there are non-HEW devices, i.e., legacy devices, that will continue to operate using the existing medium access mechanisms. The non-HEW devices may be operating independently on the same channel, i.e. an overlapping BSS (OBSS), or a HEW access point (AP) may be supporting a mixture of HEW and non-HEW devices within the same BSS.

The HEW devices will be cooperating to improve the overall performance for devices operating within the BSS. However, the non-HEW devices will behave according to the distributed contention-based medium access method described above. Consequently, without any mitigation, this is likely to result in the non-HEW devices obtaining better (or the same) performance than the HEW devices, and preventing the new HEW mechanisms from working effectively.

Therefore, there exists a need for a method and apparatus for improving communication efficiency within a BSS including a plurality of next-generation devices and legacy devices and within a BSS including next-generation devices which overlaps with another BSS including legacy devices.

SUMMARY

The present disclosure has been made to address the above problems and disadvantages, and to provide at least the advantages described below.

In accordance with an aspect of the present disclosure, a next generation device is provided. The next generation device is configured for communicating within a wireless network including an AP supporting the next generation device. The next generation device includes a shorter Slot Time for medium access than legacy devices.

In accordance with an aspect of the present disclosure, a next generation AP including in its BSS a next generation device is provided. The AP includes at least one processor configured to calculate a Slot Time for the next generation device. The calculated Slot Time for the next generation device is shorter than a Slot Time of legacy devices.

In accordance with another aspect of the present disclosure, a method for operating a wireless network by AP using prioritized access control in its BSS is provided. The method includes broadcasting, from the AP, a calculated Slot Time for a next generation device in the BSS. The calculated Slot Time for the next generation device is shorter than a Slot Time of legacy devices.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 3 is a signaling diagram illustrating a signaling sequence between the next generation devices and legacy devices in the BSS, according to an embodiment of the present disclosure; and FIG. 4 is a flowchart illustrating a method for operating a wireless network by the AP using prioritized access control in its BSS, according to an embodiment of the present disclosure.

DETAILED DESCRIPTION

Various embodiments of the present disclosure will now be described in detail with reference to the accompanying drawings. In the following description, specific details such as detailed configuration and components are merely provided to assist in the overall understanding of the embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Figure 1:
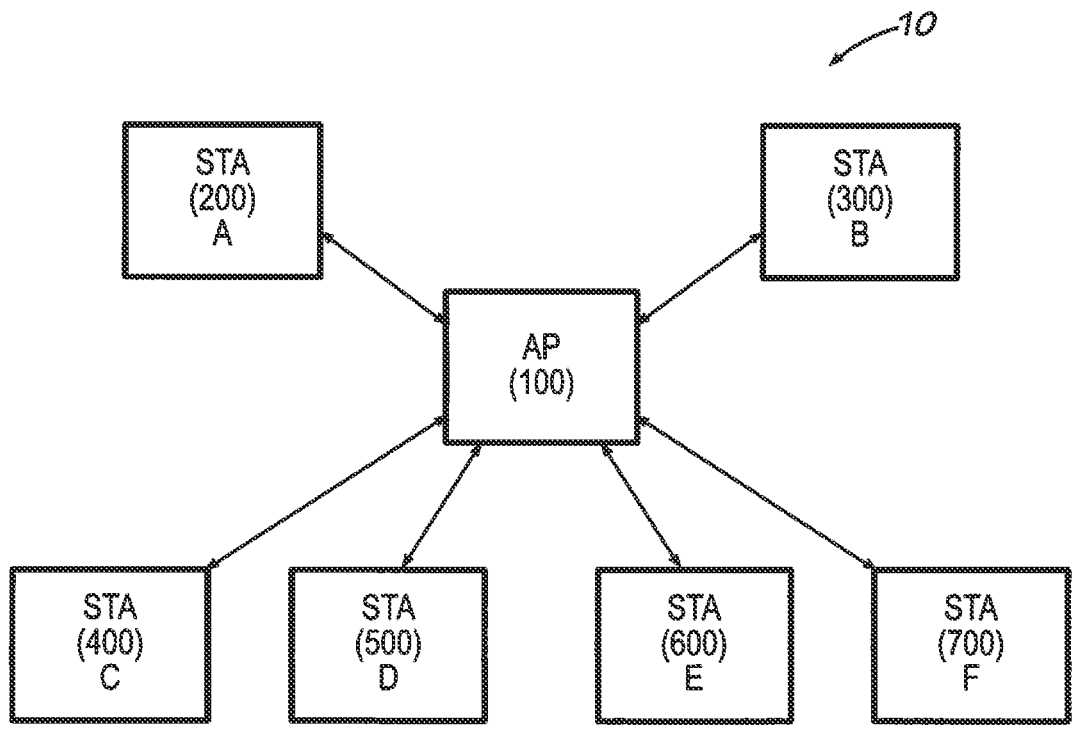
FIG. 1 is a block diagram illustrating an AP including in its BSS a plurality of next generation devices and a plurality of legacy devices, according to an embodiment of the present disclosure.

FIG. 1 is a block diagram illustrating an AP 100 including in its BSS, e.g., a network 10, a plurality of next generation devices, e.g., user stations (STAs) 400-700, and a plurality of legacy devices, e.g., STAs 200, 300, according to an embodiment of the present disclosure. The individual user STAs 200-700 may be embodied in the form of a cell phone, a personal digital assistant (PDA), a laptop, a workstation, a personal computer, a video camcorder, etc. As can be appreciated, one or more of the user STAs 200-700 can be embodied as another AP 100. Moreover, it is contemplated that the AP 100 can also be component of a larger system or device, rather than being a dedicated AP 100.

While the AP 100 will be described herein as the transmitter of the frames before and after IFS and the user STAs 200-700 as the receiving devices, it will be understood by those skilled in the art that both the AP 100 and the user STAs 200-700 can each receive and transmit signals over the network 10.

Moreover, it should be appreciated that the user STAs 200-700 may be connected to other devices and/or networks with which these user STAs may communicate. Further, though FIG. 1 only shows seven stations within the network 10, it should be appreciated that the network 10 may include more than or fewer than seven stations.

The network 10 can operate under the IEEE 802.11 standard (optionally as modified by one or more of its amendments).

For illustrative purposes, the user STAs 400-700 are described herein as next-generation devices, i.e. they have functionality enabled based on the IEEE 802.11ax amendment for HEW (or an alternative amendment similarly intended to improve performance and/or spectrum efficiency within the network 10), and the user STAs 200 and 300 are referred to as legacy devices because they do not support the IEEE 802.11ax (or alternative) performance enhancements.

The AP 100 is described herein as a next-generation device. In other words, the AP 100 is capable of communicating with the user STAs 200-700 according to the IEEE 802.11 wireless standard, taking advantage of IEEE 802.11ax (or alternative) enhancements when communicating exclusively with the user STAs 400-700.

Figure 2:
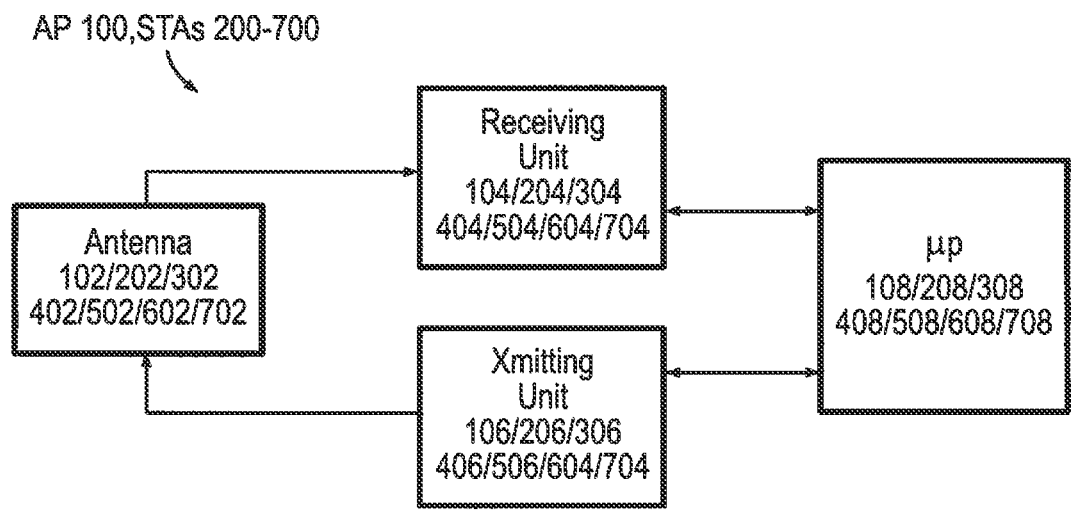
FIG. 2 is a block diagram illustrating components of the next generation devices and legacy devices shown in FIG. 1, according to an embodiment of the present disclosure.

FIG. 2 is a diagram illustrating an example of an embodiment of the components that may be included in each of the user STAs 100-700 in the network 10. As shown in FIG. 2, each of the user STAs 100-700 includes at least one antenna (e.g., 102, 202, . . . ), at least one receiving unit (e.g., 104, 204, . . . ), at least one transmitting unit (e.g., 106, 206, . . . ), and at least one microprocessor (μp) (e.g., 108, 208, . . . ). These components illustrated in FIG. 2 allow the user STAs 100-700 to selectively transmit and receive frames within the network 10.

The μp 108 of the AP 100 controls the overall operation of the AP 100 and is configured to initiate an operation of the wireless network 10. For example, the μp 108 may transmit one or more modulated frames over the network 10. After the frame is transmitted over the network 10, the μp 108 is configured to receive, from the receiving unit 104, a transmission from one or more of the user STAs 200-700. In accordance with embodiments of the present disclosure, the μp 108 may also be configured to calculate a respective Slot Time, which should be used in the BSS of the next generation AP 100, as will be described in more detail below.

The microprocessors associated with the STAs 200-700 operate similarly to the μp 108 of the AP 100.

The receiving unit 104 receives modulated frames over the network 10 and provides the modulated frames to the μp 108 for demodulation. The transmitting unit 106 transmits one or more modulated frames provided by the μp 108 over the network 10. For example, the AP 100 transmits frames including, but not limited to, data frames, control frames, management frames, and extension frames.

Moreover, the transmitting unit 106 transmits frames in accordance with special priority requirements, e.g., after a pre-defined idle period following a preceding frame transmission or reception. This pre-defined idle period includes an IFS followed by zero or more backoff slots. The IEEE 802.11 standard defines different IFSs for specific purposes. The shortest IFS are reduced interframe space (RIFS) and SIFS, both of which are used for a non-interruptible sequence of frames; following any particular frame transmission, at most, one device in the BSS is allowed to use one of these IFS. The next longer IFS is point (coordination function) interframe space (PIFS) which is used to gain priority access to the medium, e.g. to transmit critical management frames or to initiate periods of contention free access; its duration is SIFS plus one Slot Time. Normal data transmission is initiated after either DIFS or AIFS followed by a variable number of backoff slots; these interframe spaces have a duration of SIFS plus two or more Slot Time. Devices supporting QoS use different AIFS depending on the type of traffic to be transmitted, with voice traffic using the shortest interframe space and background traffic using the longest. Other interframe spaces are used for specific purposes such as recovery after a frame received with an error, or to support beamforming. Devices transmitting using IFS longer than SIFS contend for access to the medium; the device using the fewest slots (IFS plus backoff) starts to transmit, and devices using more slots detect their transmission and defer. Use of a shorter IFS and a smaller number of backoff slots therefore results in higher priority medium access.

The SIFSs are used for the highest-priority transmissions. Once these high-priority transmissions begin, the network 10 becomes busy, so frames transmitted after the SIFS interval has elapsed have priority over lower-priority frames that can be transmitted only after longer intervals, such as the PIFS, DIFS and AIFS intervals described above.

The receiving and transmitting units associated with the STAs 200-700 operate similarly to the receiving unit 104 and transmitting unit 106 of the AP 100.

As can be appreciated, the user STAs 400-700 may also include components that allow these user STAs to function according to the parameters of the IEEE 802.11ax amendment to improve the performance in highly congested environments.

The user STAs 200-700 are configured to transmit a queued frame, according to prioritized access to the wireless network 10. More particularly, the user STAs 200 and 300, which are legacy devices, will access the wireless network at a Slot Time of either 9 μs or 20 μs. For example, the user STA 200 may initiate transmissions as early as SIFS+3×9 μs (e.g., best-effort access to the network 10), while the user STA 300 may initiate transmissions at SIFS+2×9 μs (in the case of voice and video access transmissions. Moreover, legacy APs, which may be present in another network, for example, an OBSS, may initiate transmissions as early as SIFS+1×9 μs (e.g., in the case of voice and video access transmissions).

In accordance with the embodiments of the present disclosure, it has been found that using a shorter (or reduced) Slot Time for the user STAs 400-700, e.g., the next-generation devices, may help to ensure that these user STAs can receive preferential access to the wireless network 10, e.g., both for the part of IFS after SIFS and for the backoff. As can be appreciated, certain backoff rules that govern the wireless network 10 would, at times, allow the user STAs 200 and 300 to access the wireless network 10 before the user STAs 400-700.

The Slot Time of the user STAs 400-700 may be determined based on one or more parameters associated with a frame that may be transmitted within the wireless network 10; it is noted that all of the user STAs 400-700 in a particular BSS will need to use the same Slot Time. One parameter, for example, may include an air propagation time of a signal at a maximum BSS diameter. In the types of applications envisaged by HEW, e.g., dense deployments, it is reasonable to assume that the BSS diameter will be relatively small, so 1 μs (which corresponds to a BSS diameter of 150 m) has been found to be sufficient.

Another parameter that may be used in determining the Slot Time of the user STAs 400-700 may include a clear channel assessment (CCA) procedure, which includes determining if one of an energy detect (ED) threshold and preamble detect (PD) threshold has been met. With respect to ED, it has been found that 1 μs is sufficient to determine such a threshold. With respect to PD, it has been found that 4 μs is sufficient to determine such a threshold. In addition, it is noted that PD can be performed concurrently with ED. In view of the foregoing, it has been determined that the CCA procedure can take between 1 μs and 4 μs.

Moreover, a receive-transmit turnaround time of a signal received at and transmitted from the user STAs 400-700 may also be used for determining the Slot Time of the user STAs 400-700. It has been determined that such a turnaround time takes approximately 2 μs.

In view of the foregoing, subject to any regulatory constraints, a suitable Slot Time for the user STAs 400-700 can range from approximately 4 μs (for a CCA procedure implementing ED) to about 7 μs (for a CCA procedure implementing PD or PD and ED), which would provide a significant medium access advantage to next-generation devices (e.g., the user STAs 400-700) using it, and hence mitigate the effect of legacy devices (e.g., the user STAs 200 and 300) on the medium.

In accordance with an embodiment of the present disclosure, a Slot Time for the user STAs 400-700 is a statically configured parameter set by a manufacturer of the user STAs 400-700, i.e., the Slot Time is a fixed value that is determined by a manufacturer of the user STAs 400-700 (or specified in the IEEE 802.11ax amendment) using one or more of the aforementioned parameters.

Alternatively, the Slot Time for the user STAs 400-700 is dynamically determined based on at least one of a BSS coverage area, channel conditions, and capabilities of the user STAs 200-700 in the BSS. In such an embodiment, the μp 108 of the AP 100 is programmed to calculate a Slot Time for the user STAs 400-700 and transmit the calculated Slot Time to the user STAs 400-700. For example, the μp 108 of the AP 100 may transmit the calculated Slot Time in one or more of its frames, e.g., its Beacon and Probe Response frames, to the user STAs 400-700.

Regardless of how the user STAs 400-700 obtain the Slot Time, the net result is that the user STAs 400-700 will be probabilistically more likely to transmit over the medium within the network 10 than the user STAs 200, 300 using the same QoS category and parameters, i.e., the medium does not need to be idle for as long a duration.

FIG. 3 is a signaling diagram illustrating a signaling sequence between user STAs that communicate over a wireless network, according to an embodiment of the present disclosure. And, FIG. 4 is a flowchart illustrating a method for operating the wireless network 10 by the AP using prioritized access control in its BSS, according to an embodiment of the present disclosure.

Initially, a frame (or packet) is transmitted, via the medium of the network 10, from the μp 108 of the AP 100 to the user STAs 200-700. After the end of the frame transmission on the medium, the user STAs 200-700, typically, will have to wait for the expiry of the SIFS time interval (e.g., 10 μs). Assuming that there is no immediate response to the frame, then in accordance embodiments of the present disclosure, the earliest times that the user STAs 200-700 can access the medium is shown with the lettered arrows A-F of FIG. 3, which corresponds to the STAs 200-700, respectively.

For example, assume that the user STA 200, which is a legacy device, uses points A or B, and the user STA 400, which is a next-generation device, uses points C, D, E or F. As shown in FIG. 3, since the user STA 400 has the opportunity to transmit at points C and D which are both before point A and points E and F which are both before point B, the user STA 400 will be more probabilistically likely to be the STA that ends up transmitting. The points C-F correspond to the reduced Slot Time that is calculated by the AP 100 for the user STAs 200-700 and broadcast to the user STAs 200-700 by the AP, at step 800 of FIG. 4.

Point A, for example, is the earliest time, after SIFS, e.g., one slot (9 μs), that a legacy device, e.g., the user STA 200, using PIFS (or another AP using AIFSN[i]=2 (AC_VO and AC_VI default)), can access the medium. Point B is the earliest time, after SIFS, e.g., two slots (18 μs), that a legacy device, e.g., the user STA 300, using DIFS (or non-AP STA using AIFSN=2 (AC_VO and AC_VI default)) can access the medium.

Point C is the earliest time, after SIFS, e.g., one reduced slot (4 μs), a next-generation device, the user STA 400, using PIFS (or a next-generation AP, e.g., AP 100 using AIFSN=2 (AC_VO and AC_VI default)), can access the medium. Point D is the earliest time, after SIFS, e.g., two slots (8 μs), a next-generation device, e.g., the user STA 500, using DIFS (or non-AP STA using AIFSN=2 (AC_VO and AC_VI default)) can access the medium. Points E and F correspond to next-generation devices, e.g., the user STAs 600 and 700, respectively, which use AIFSN=3 (AC_BE default) and AIFSN=4.

As can be appreciated, the user STAs 400-700 can also be configured to access the medium, after SIFS, according to a reduced Slot Time of less than 9 μs.

By using priority access control, according to embodiments of the present disclosure, to access the medium of the wireless network 10, the next-generation devices, e.g., the user STAs 400-700, receive preferential access to the medium of the network 10, thereby improving communication efficiency within the network 10. More particularly, it is probabilistically more likely that the user STAs 400-700, which use a shorter Slot Time, will acquire a particular medium access opportunity than the user STAs 200, 300, which use the traditional longer Slot Time, and over time the user STAs 400-700 will statistically have preferential access to a particular medium.

As can be appreciated, the communication efficiency increases with the AIFSN (i.e. lower-priority access categories) and with CW, i.e. backoff caused by medium occupancy.

In embodiments according to the present disclosure, to further improve communication efficiency, the value of SIFS used to derive other longer IFSs[x] can be reduced which would provide even greater access for the user STAs 400-700 to the medium of the wireless network 10. To maintain reliable operation of the legacy devices the resulting PIFS (and longer IFSs) must remain longer than the legacy SIFS duration, and the resulting DIFS and AIFS must remain longer than the legacy PIFS duration.

In embodiments according to the present disclosure, AIFS [i] time interval settings and CW settings can be adjusted, in addition to the reduced Slot Times of the user STAs 400-700, for achieving various priority protocols between HEW and legacy networks. Additionally, the reduced Slot Times of the user STAs 400-700 may also be combined with higher-layer traffic management or scheduling techniques, and PHY enhancements such as use of OFDM-A or uplink MU-MIMO.

The present disclosure and aspects thereof are capable of being distributed in the form of a non-transitory computer-readable program product stored in a tangible computer medium having stored thereon a plurality of executable instructions. The plurality of executable instructions may be in a variety of forms for execution on a processor, processors, or the like, and the present disclosure applies equally regardless of the particular type of signal-bearing media used to actually carry out the distribution.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method for operating a wireless network by an access point (AP) using prioritized access control, the method comprising:
    initiating, by the AP, an operation of the wireless network;
    allowing, after the operation is initiated, a first device having a first slot time that is calculated by the AP to access the wireless network; and
    allowing, after the first device has accessed the wireless network, a second device having a second slot time that is calculated by the AP to access the wireless network,
    wherein the second slot time of the second device is longer than the first slot time of the first device such that after a given inter-frame space (IFS) has expired, the first device is allowed to transmit over the wireless network prior to the second device being allowed to transmit over the wireless network thereby decreasing communication traffic over the wireless network, and
    wherein the first slot time of the first device ranges from 4 µs to 7 µs and the second slot time of the second device ranges from 9 µs to 20 µs.

2. The method of claim 1, wherein the first slot time is determined based on parameters including air propagation time of a signal at a maximum base service set (BSS) diameter, a clear channel assessment (CCA) procedure, which includes determining if one of an energy detect (ED) threshold and preamble detect (PD) threshold has been met, and a receive-transmit turnaround time of a signal received at and transmitted from the second device.

3. The method of claim 1, wherein the first device and second device access the wireless network during one of a point coordination function IFS (PIFS) time interval, an arbitration inter-frame spacing (AIFS) time interval, and the DIFS time interval.

4. The method of claim 1, wherein the first device and second device access the wireless network after expiry of a short IFS (SIFS) time interval.

5. The method of claim 1, wherein the first device is a next generation device and the second device is a legacy device.

6. The method of claim 1, wherein the first slot time and the second slot time of the first device and the second device, respectively, are a fixed value.

7. The method of claim 1, wherein the first slot time and the second slot time is a statically configured parameter set by a manufacturer of the first device.

8. A wireless device for managing a wireless network using prioritized access control, the wireless device comprising:
    at least one processor including hardware and circuitry configured to initiate an operation of the wireless network, receive, after the operation is initiated, a transmission from a first device having a first slot time for accessing the wireless network, and receive, after the first device has accessed the wireless network, a transmission from a second device having a second slot time for accessing the wireless network, wherein the second slot time of the second device is longer than the first slot time of the first device such that after a given inter-frame space (IFS) has expired, the first device is allowed to transmit over the wireless network prior to the second device being allowed to transmit over the wireless network thereby decreasing communication traffic over the wireless network, and
    wherein the first slot time of the first device ranges from 4 µs to 7 µs and the second slot time of the second device ranges from 9 µs to 20 µs.

9. A non-transitory computer-readable medium embodied in a system on a chip having stored thereon a plurality of executable instructions, the plurality of instructions comprising instructions to:
    initiate an operation of the wireless network, receive, after the operation is initiated, a transmission from a first device having a first slot time for accessing the wireless network, and receive, after the first device has accessed the wireless network, a transmission from a second device having a second slot time for accessing the wireless network, wherein the second slot time of the second device is longer than the first slot time of the first device such that after a given inter-frame space (IFS) has expired, the first device is allowed to transmit over the wireless network prior to the second device being allowed to transmit over the wireless network thereby decreasing communication traffic over the wireless network, and
    wherein the first slot time of the first device ranges from 4 µs to 7 µs and the second slot time of the second device ranges from 9 µs to 20 µs.

* * * * *